United States Patent [19]

Sporer

[11] 3,737,860

[45] June 5, 1973

[54] MEMORY BANK ADDRESSING

[75] Inventor: Michael Sporer, Somerville, Mass.

[73] Assignee: Honeywell Information Systems Inc., Waltham, Mass.

[22] Filed: Apr. 13, 1972

[21] Appl. No.: 243,700

[52] U.S. Cl. ..........340/172.5
[51] Int. Cl. ..........G11c 7/00
[58] Field of Search ..........340/172.5

[56] References Cited

UNITED STATES PATENTS 3,553,653 1/1971 Krock..........340/172.5

*Primary Examiner*—Raulfe B. Zache
*Attorney*—John S. Solakian, Ronald T. Reiling and Fred Jacob

[57] ABSTRACT

Any one of multiple memory banks and storage locations therein are selected in response to a first address and a second address respectively. The first address is formed in either of two registers, one of which is selected in response to a bank select signal. In response to an interrupt condition, either or both of the registers are enabled to address preselected ones of the memory banks. Further means are provided to restore either or both of the registers to their contents prior to the interrupt condition.

12 Claims, 3 Drawing Figures

| REGISTER | INITIALIZE | SMK | JMP | INT |
|---|---|---|---|---|
| BSO | 00 | 00 | 00 | 00 |
| BS1 | 01 | 10 | 10 | 10 |
| BRO | 00 | 00 | 00 | 00 |
| BR1 | 01 | 01 | 10 | 01 |

MEMORY BANK ADDRESSING

BACKGROUND OF THE INVENTION

The present invention generally relates to memory addressing systems and more particularly to means for addressing any number of memory banks in the system independent of the length of a normally provided address word.

A memory system is usually divided into a plurality of memory banks, each including a plurality of addressable storage locations. If each of the memory banks includes by way of example approximately 16,000 addressable storage locations, then 14 bits of an address word are required to address all of those locations. Some of these address bits are typically provided by an instruction word which also includes operation code bits. Further address bits are provided by a program counter. If the system includes two memory banks, then an extra address bit is required. If the system includes four memory banks then 2 extra address bits are required in order to select the memory bank desired. Thus, additional memory banks require added address bits. Since the instruction word in addition to including some of the address bits and operation code bits also includes bits indicating for example indexing, indirect addressing, etc., and further where the number of bits in an instruction word is limited, for example, to approximately 16 bits, then the addressing of any one of a plurality of memory banks usually requires a complex addressing scheme. In some cases, no such scheme exists.

In addition, where the system is coupled for response to interrupt conditions, additional complexity of operation is required. For example, in a memory system having multiple memory banks, programs for processing such interrupt conditions usually reside in predetermined first and/or second memory banks. Accordingly, any address normally generated, must be overridden by the address to the first and/or second memory banks in response to the interrupt condition. Further, it is often required that the processing at the address just prior to the generation of the interrupt condition must be returned to after the interrupt condition is responded to. Accordingly, such last mentioned address must be saved before it may be cleared due to the interrupt condition.

It is accordingly an object of the invention to provide a memory addressing technique whereby a plurality of memory banks may be addressed independent of the length of the normally provided address word.

It is another object of the invention to provide a memory bank addressing technique which may be switched to address predetermined ones of the memory banks in response to an interrupt condition.

It is still another object of the invention to provide a multiple memory bank addressing technique which after responding to an interrupt condition restores the address previously indicated prior to the interrupt condition.

SUMMARY OF THE INVENTION

The purposes and objects of the invention are satisfied by providing a memory having a plurality of memory banks, each of the memory banks including a plurality of storage locations. In addition to means for addressing any one of the locations in a selected one of the memory banks, further means are provided for addressing a first selected one of the memory banks and a second selected one of the memory banks. In response to a first or second signal respectively, either the first or the second selected one of the memory banks is addressed. Further, in response to an interrupt signal, instead of addressing one of the selected ones of the memory banks, a predetermined first or second memory bank is addressed which memory bank includes that program which is utilized to process the interrupt condition. Upon servicing of the interrupt condition, means are provided to restore the addressing of the first or second selected ones of the memory banks.

BRIEF DESCRIPTION OF THE DRAWINGS

The advantages of the foregoing configuration of the present invention become more apparent upon reading the accompanying detailed description in conjunction with the figures in which.

DETAILED DESCRIPTION OF THE PREFERRED EMBODIMENTS

Figures 1, 3:
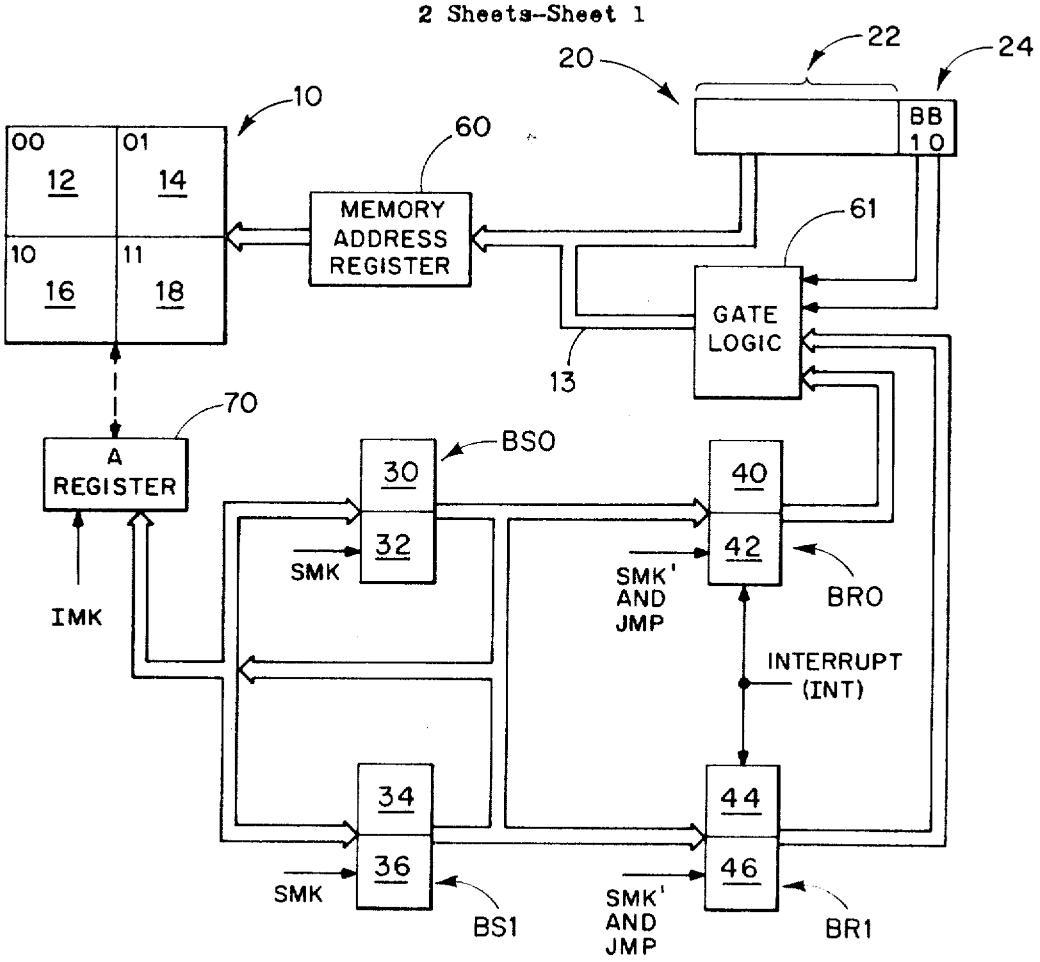
FIG. 1 is a general block diagram illustrating the apparatus of the invention.
FIG. 3 is a state diagram illustrating the operation of the apparatus of the invention.

Now referring to FIG. 1, there is shown a memory 10 which by way of example includes four memory banks 12, 14, 16 and 18. Further by way of example each of the memory banks includes up to 16,000 word storage locations, it being noted that the number of locations in each memory bank need not be the same. Each memory bank is identified by a unique 2-bit address. For example, the address for memory bank 12 is the logical 00 state, whereas the address for memory bank 18 is the logical 11 state. It should be noted that the inclusion of four memory banks in memory 10 is by way of example only. For example, up to eight memory banks may have been included in memory 10 in which case each bank would have been identified by a unique 3 bit address. Memory 10 is shown to be addressable by memory address register 60. Memory address register 60 is shown to receive its input from address word 20 and either of two registers BR0 or BR1 via gate logic 61. Address word 20 includes two segments 22 and 24. Segment 22 includes address bits for addressing each word storage location in any one of the memory banks. For example, if the memory bank includes 16,000 word storage locations, then segment 22 would include 14 address bits. The address bits in segment 22 are provided by conventional means such as, for example, by the combination of the address bits received from an instruction word and the address bits provided by a program counter. The source of such address bits in segment 22 is not a part of this invention and need not be further explained. Segment 24 of address word 20 is identified as the bank bit. If the bank bit is in a logical 1 state, then register BR1 is enabled through the gate logic 61 to register 60. If the bank bit in segment 24 is in a logical 0 state then the contents of register BR0 are enabled via gate logic 61 to register 60.

There are two 2-bit bank registers BR0 and BR1, each of which contains the address of one of the four memory banks 12, 14, 16, and 18. If there are up to eight memory banks in memory 10 then the bank registers BR0 and BR1 would include 3 bits each. The two memory banks currently specified in the BR registers constitute the address space of a machine, i.e., only those memory locations that are in the two memory banks specified in the BR registers are addressable. Thus, if register BR0 which includes individual storage elements 40 and 42 has stored therein a logical zero in each individual storage element, then when the bank bit is a logical zero, memory bank 12 will be addressed. The register BR1 also includes two individual storage elements 44 and 46 which may include the same contents as register BR0 or may include, for example, the address of memory bank 14. In such case, storage element 44 would include a logical zero and storage element 46 would include a logical one. When the bank bit is a logical one, then memory bank 14 would be capable of being addressed.

Thus it can be seen that by the use of 1 bit in the address word 20, any one of a plurality of memory banks may be addressed in memory 10. As stated hereinbefore, memory 10 may include any number of memory banks. For example, if there were 16 memory banks, then each of the registers BR0 and BR1 would include four individual storage elements in order to identify a unique four bit code. Further by including two registers BR0 and BR1, any one of two memory banks may be addressed simply by changing the logical state of the bank bit in segment 24 of address word 20.

Typically in any system, programs reside in certain banks of the memory which are responsive to an interrupt condition. For example, basic programs which are usually required in response to an interrupt condition may reside in memory bank 12 and/or memory bank 14. Typically, therefore, in response to an interrupt signal, the registers BR0 and BR1 are preconditioned respectively to include the logical 00 state and the logical 01 state in order to address memory banks 12 and 14 dependent upon the state of the bank bit in segment 24. If all programs responsive to an interrupt are in one memory bank, then both registers BR0 and BR1 might be forced to address that particular memory bank. During normal operation, one register BR0 may be addressing a basic memory bank such as memory bank 12, whereas the other register BR1 may be addressing another bank such as memory bank 18. In response to an interrupt condition, registers BR0 and BR1 may be preconditioned to address banks 12 and 14. Because of the simple binary character of the unique address for each of the memory banks, the interrupt signal may be implemented so as to either set or reset the particular storage elements such as 40, 42, 44 and 46 in response to the interrupt condition. This is seen in more detail with reference to FIG. 2.

Also shown in FIG. 1 are two bank state registers BS0 and BS1 which are used to monitor and change the contents of the bank registers BR0 and BR1 respectively. Register BS0 includes storage elements 30 and 32 whereas register BS1 includes elements 34 and 36. The number of such elements in the register BS0 and BS1 directly corresponds to the number of elements in registers BR0 and BR1 respectively.

Also shown in FIG. 1 is the A register 70 which may be in an accumulator of a processor coupled with memory 10. The A register 70 may be coupled with memory 10 for bidirectional transfer of information or with another storage device. Also shown in FIG. 1 are signals designated SMK, SMK', JMP and IMK. The SMK' signal is generated in response to the SMK signal. Each of the other signals are generated under program control. The SMK signal is utilized to transfer the contents of register 70 into the BS registers, the IMK signal is utilized to transfer the contents of the BS registers into register 70 and the JMP signal is utilized to transfer the contents of the BS registers into the BR registers.

The A register 70 is shown coupled with registers BS0 and BS1 for bidirectional transfer for information. In general operation therefore and after the registers BS0, BS1, BR0 and BR1 are initialized as shall hereinafter be explained, the BS registers are loaded with the respective contents of the A register 70 in response to an SMK signal. The contents of registers BS0 and BS1 are transferred into registers BR0 and BR1 respectively in response to the SMK' and JMP signals. The contents of registers BR0 and BR1 are thus respectively utilized to address memory 10 via register 60 dependent upon the state of the bank bit of segment 24. Upon the generation of an interrupt signal, the registers BR0 and BR1 are preconditioned for addressing predetermined memory banks in memory 10 and as for example, hereinbefore stated, they may be preconditioned to address the memory banks 12 and 14 respectively. An IMK signal is generated enabling the contents of registers BS0 and BS1 to be transferred into the A register 70 thereby saving the addresses contained in registers BR0 and BR1 prior to the generation of the interrupt signal. The contents now stored in the A register 70 may be in turn transferred to memory 10 or any other suitable storage means. Upon the completion of the response to the interrupt condition by way of processing or otherwise, an SMK signal again generated whereby the contents of the A register 70 which contains the addresses previously in the registers BR0 and BR1 are again sent to the registers BS0 and BS1. Normal operation is again resumed after the SMK' signal and the JMP signal are generated thereby transferring the contents of registers BS0 and Bs1 respectively to registers BR0 and BR1.

Figure 2:
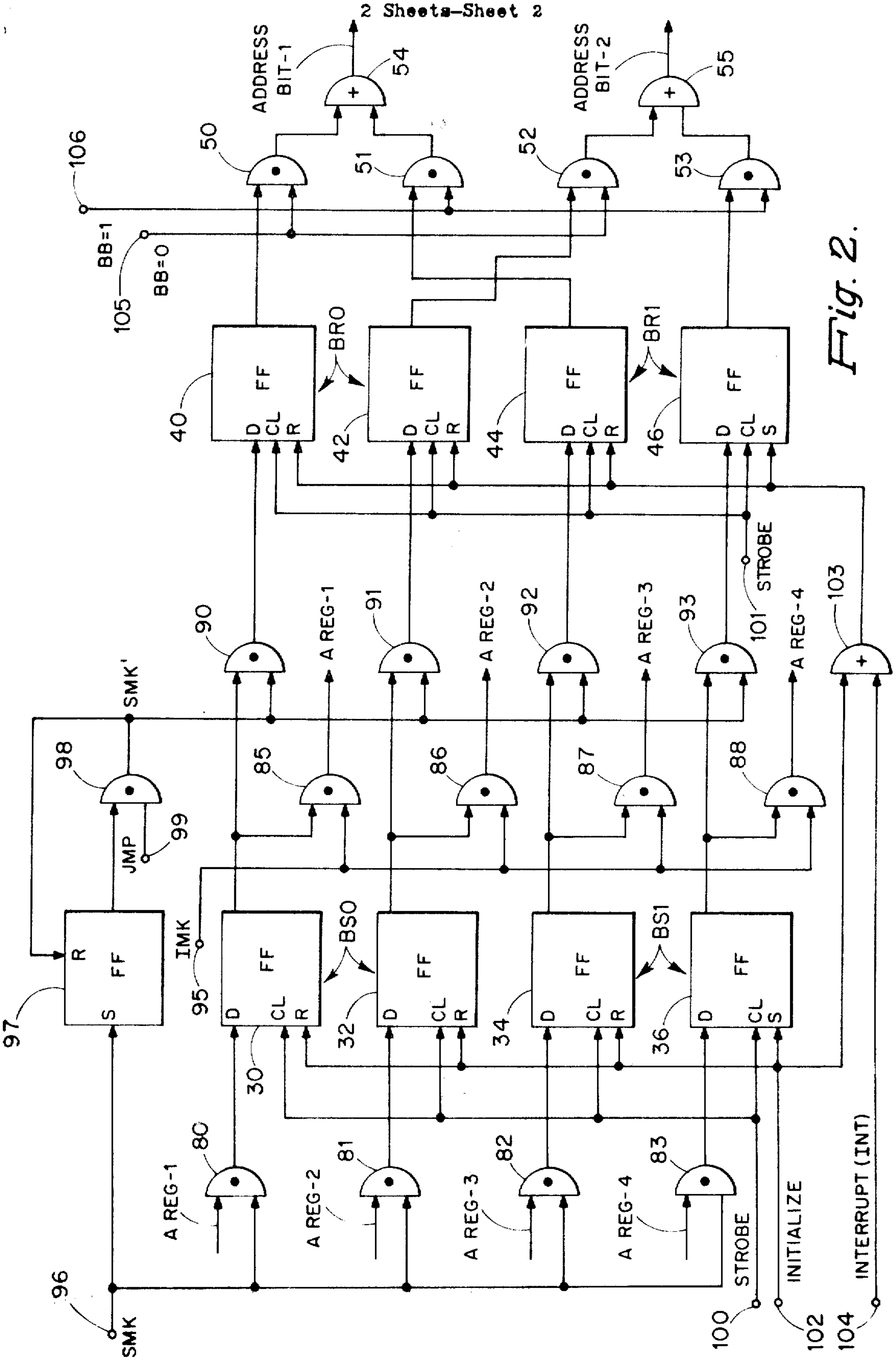
FIG. 2 is a detailed block diagram illustrating the apparatus of the invention.

The operation of the apparatus of the invention may be more specifically seen with reference to FIG. 2 and the state diagram of FIG. 3. In FIG. 2, registers BS0, BS1, BR0 and BR1 are shown to include D-type flip-flops for each of the respective storage elements thereof. The input terminals of these flip-flops are designated D and in operation the input signals provided at the D terminal are provided to the output terminal in response to a strobe signal received at the clock (CL) input thereof. The respective flip-flops also include set and reset inputs which are utilized in response to the initialize and interrupt signals. The gate logic 62 of FIG. 1 is shown in FIG. 2 to include AND gates 50 through 53 or OR gates 54 and 55. The outputs of gates 54 and 55 correspond to that bus path 13 shown in FIG. 1. The input paths to the respective storage positions of the A register 70 are shown to be provided from the outputs of flip-flops 30, 32, 34 and 36 via AND gates 85 through 88 in response to the IMK signal at terminal 95. The inputs to flip-flops 30, 32, 34 and 36 from the respective storage positions of the A register 70 are shown to be provided via AND gates 80 through 83 as enabled by the SMK signal at terminal 96. The SMK' signal is shown to be generated in response to the SMK signal via flip-flop 97 which is set in response to the SMK signal to provide an input to AND gate 98, which is fully enabled by the JMP signal at terminal 99. This produces the SMK' signal which resets flip-flop 97 and which further enables the transfer of the contents of flip-flops 30, 32, 34 and 36 respectively, via AND gates 90 through 93 to the inputs of flip-flops 40, 42, 44 and 46. The strobe signals for each of the register storage elements are shown to be provided via terminals 100 and 101. Such strobe signals may be provided from the same source or may be provided by separate sources dependent upon further requirements of the total system. The initialize signal is provided via terminal 102 to the respective storage elements of the BS registers and to the respective elements of the BR registers via OR gate 103. The interrupt signal is provided via terminal 104 through OR gate 103 to the storage elements of the BR registers. The logical zero state of the bank bit is provided via terminal 105 whereas the logical one state of the bank bit is provided via terminal 106. Terminal 106 is coupled to AND gates 51 and 53 which are associated with the flip-flops 44 and 46 of the BR1 register whereas terminal 105 is coupled to AND gates 50 and 52 which are associated with the flip-flops 40 and 42 of the BR0 register.

Now referring to FIG. 3, there is shown a state diagram which includes the various logical conditions stored in the registers BS0, BS1, BR0 and BR1 in response to the initialize SMK, JMP, and INT signals. By way of example the logical 10 state shown for the BS1 register under the SMK heading means that in response to the SMK signal, the flip-flops 34 and 36 have provided the logical 1 and logical 0 states at their respective outputs. Thus in start up of the system an initialize signal is generated such that flip-flops 30, 32 and 34 are reset to provide a logical zero state at their outputs and flip-flop 36 is set. The setting and resetting of flip-flops 40, 42, 44 and 46 correspond respectively to the initialize case. Accordingly the BR0 and BR1 registers address memory banks 12 and 14 respectively.

Memory banks 12 and 14 will be addressed depending upon the logical state of the bank bit. It should be understood however, that the initializing may have set or reset any one of the various flip-flops so that the initial condition address may point to any one of the memory banks. Should it be necessary to address another memory bank other than that indicated by the initialized state of the BR0 and BR1 registers, then an SMK signal is generated under program control and the logical address of the memory banks desired to be addressed are transferred from A register 70 to the BS0 and BS1 registers in response to the strobe signal. The SMK signal sets flip-flop 97 thereby partially enabling AND gate 98 which is further enabled in response to the JMP signal at terminal 99 thereby producing the SMK' signal. The SMK' signal enables the transfer of the contents of the BS registers to the respective BR registers upon the occurrence of the strobe pulse at terminal 101. In this case it can be seen from the state diagram of FIG. 3 that in response to the SMK signal the contents of the A register 70, i.e., the logical 00 and logical 10 states are loaded into the BS0 and BS1 registers respectively. The BR0 and BR1 registers are not effected at that time. Also as shown by FIG. 3, upon the occurrence of the JMP signal, the BS0 and BS1 registers are not effected and the contents of the BSO and BSI registers are transferred into the BR0 and BR1 registers respectively, such that the logical 00 and logical 10 states are stored in the BR0 and BR1 registers respectively. Thus either memory bank 12 or memory bank 16 is addressed dependent upon the logical state of the bank bit. Processing continues in either of the last mentioned memory banks until an interrupt condition is generated.

In response to such interrupt condition, the interrupt signal at terminal 104 is generated and couples via OR gate 103 to set flip-flop 46 and reset flip-flops 40, 42 and 44 thereby causing the BR0 register to address memory bank 12 and the BR1 register to address memory bank 14, the BR register selected depending upon the logical state of the bank bit. Here again it is understood that the interrupt signal may have set or reset such flip-flops of the BR registers as may be preselected by the requirements of the system. In response to the interrupt condition, an IMK signal is generated under program control thereby enabling gates 85 through 88 so that the A register 70 may receive the contents of the BS registers. Upon completion of the interrupt condition, the SMK signal is generated thereby causing the contents of the A register 70 to be transferred to the BS registers and in response to the JMP signal to be transferred to the BR registers. The operation again continues until another interrupt signal is generated.

It should be understood that various changes may be made to the apparatus of the invention without departing from the scope of the invention. For example, in FIG. 2 the AND gates 90 through 93 may be eliminated, i.e., the outputs of lip-flops 30, 32, 34 and 36 may be directly coupled to the D input terminals of flip-flops 40, 42, 44 and 46 respectively in which case the SMK' signal would be coupled to terminal 101 rather than the strobe signal. Thus the contents of the BS registers would be transferred to the BR registers upon the generation of the SMK' signal only. The logic of FIG. 2 may be further modified such as by coupling the strobe signal to reset flip-flop 97 rather than the SMK' signal. This would avoid any possibility of a race condition.

Having described the invention, what is claimed as new and novel and secured by Letters Patent is:

1. The combination comprising:

A. a memory having a plurality of memory banks, each of said memory banks including a plurality of storage locations;

B. first means for addressing any one of said locations in a selected one of said memory banks;

C. second means for addressing a first selected one of said memory banks;

D. third means for addressing a second selected one of said memory banks;

E. means for generating either a first signal or a second signal;

F. first means, responsive to said first signal, for enabling said second means for addressing; and G. second means, responsive to said second signal, for enabling said third means for addressing.

2. The combination of claim 1 further comprising:

A. means for generating an interrupt signal; and

B. means, responsive to said interrupt signal, for enabling said second means for addressing to address a predetermined one of said memory banks.

3. The combination of claim 2 further comprising means, responsive to said interrupt signal, for enabling said third means for addressing to address said predetermined one of said memory banks.

4. The combination of claim 2 further comprising means, responsive to said interrupt signal, for enabling said third means for addressing to address another predetermined one of said memory banks.

5. The combination of claim 4 further comprising:
A. means for generating a third signal following a response to said interrupt signal; and
B. means, responsive to said third signal, for respectively restoring said second and third means for addressing with the addresses of said first and second selected ones of said memory banks.

6. The combination of claim 2 further comprising:
A. means for generating a third signal following a response to said interrupt signal; and
B. means, responsive to said third signal, for restoring said second means for addressing with the addresses of said first selected one of said memory banks.

7. A memory addressing system for addressing a memory having a plurality of memory banks, each of said memory banks including a plurality of storage locations, said system comprising:
A. a memory address register coupled to address one storage location in one of said memory banks corresponding to an address word transferred to said address register;
B. means for providing a first segment of said address word to said address register, said first segment indicating the address of a storage location to be addressed;
C. a first register for storing a second segment of said address word;
D. a second register for storing a second segment of said address word, said second segment in either said first or second registers indicating the address of a memory bank to be addressed;
E. means for providing a bank select signal; and
F. means, responsive to said bank select signal, for transferring the second segment in either said first or second registers to said address register.

8. The system of claim 7 further comprising:
A. means for generating an interrupt signal; and
B. means, responsive to said interrupt signal, for causing said second segment of said address word stored in either or both of said first and second registers to indicate the address of a predetermined one or ones of said memory banks.

9. The system of claim 7 further comprising:
A. a third register;
B. a fourth register;
C. further storage means;
D. means for generating a load signal;
E. means, responsive to said load signal, for transferring the address or addresses of a certain one or different ones of said memory banks from said further storage means to said third and fourth registers respectively;
F. means for generating a jump signal;
G. first means, responsive to said jump signal, for transferring the address stored in said third register to said first register; and
H. second means, responsive to said jump signal, for transferring the address stored in said fourth register to said second register.

10. The system of claim 9 further comprising:
A. means for generating an interrupt signal; and
B. means, responsive to said interrupt signal, for causing said second segment of said address word stored in either or both of said first and second registers to indicate the address of a predetermined one or ones of said memory banks.

11. The system of claim 10 wherein each of said first and second registers include a plurality of bistable storage means, each having a set and reset input and wherein said interrupt signal is received at either said set or reset inputs in order to generate the address of said predetermined one or ones of said memory banks in response to said interrupt signal.

12. The system of claim 10 further comprising:
A. means for generating an unload signal; and
B. means, responsive to said unload signal, for transferring the addresses stored in said third and fourth registers to said further storage means.

* * * * *